(12) United States Patent
Jurzak

(10) Patent No.: US 9,743,257 B2
(45) Date of Patent: Aug. 22, 2017

(54) METHODS AND SYSTEMS FOR AUTOMATIC CREATION OF TALKGROUPS BASED ON RECEIVED SIGNAL STRENGTH INDICATOR (RSSI)

(71) Applicant: MOTOROLA SOLUTIONS, INC, Chicago, IL (US)

(72) Inventor: Pawel Jurzak, Cracow (PL)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/125,628

(22) PCT Filed: Jun. 12, 2014

(86) PCT No.: PCT/PL2014/000063
§ 371 (c)(1),
(2) Date: Sep. 13, 2016

(87) PCT Pub. No.: WO2015/190940
PCT Pub. Date: Dec. 17, 2015

(65) Prior Publication Data
US 2017/0134912 A1 May 11, 2017

(51) Int. Cl.
*H04B 7/00* (2006.01)
*H04W 4/08* (2009.01)
(Continued)

(52) U.S. Cl.
CPC ............ *H04W 4/08* (2013.01); *H04B 17/318* (2015.01); *H04W 76/002* (2013.01)

(58) Field of Classification Search
CPC ....... H04B 17/318; H04W 4/008; H04W 8/00
(Continued)

(56) References Cited

U.S. PATENT DOCUMENTS

| 4,833,452 A | 5/1989 | Currier |
| 5,003,619 A | 3/1991 | Morris et al. |

(Continued)

FOREIGN PATENT DOCUMENTS

| EP | 544095 A1 | 10/1992 |
| EP | 546720 B1 | 6/1993 |

(Continued)

OTHER PUBLICATIONS

The International Search Report and the Written Opinion, SN: PCT/PL2014/000063, filed: 12 Jun. 12, 2014, all pages.

*Primary Examiner* — Tan H Trinh

(57) ABSTRACT

Disclosed herein are methods and systems for automatic creation of talkgroups based on received signal strength indicator (RSSI). In one embodiment, a first mobile radio broadcasts a talkgroup invite and receives responses from other mobile radios. The first mobile radio selects one or more of those other mobile radios based at least in part, for each received response, on one or both of (i) an invite-RSSI value included in the response and associated with receipt of the invite by the mobile radio from which the response was received and (ii) a response-RSSI value associated with receipt by the first mobile radio of the response. The first mobile radio establishes a talkgroup that includes itself and the one or more selected other mobile radios, and communicates as a participant in the established talkgroup.

17 Claims, 13 Drawing Sheets

(51) Int. Cl.
  *H04W 76/00* (2009.01)
  *H04B 17/318* (2015.01)
(58) Field of Classification Search
  USPC ..... 455/518, 519, 445, 517, 41.2, 41.1, 501,
  455/436, 452, 521, 520, 456.3, 90.2, 463,
  455/422.1, 416, 509; 370/328, 203, 347,
  370/254; 709/217, 206
  See application file for complete search history.

(56) References Cited

U.S. PATENT DOCUMENTS

| | | | |
|---|---|---|---|
| 5,257,408 A | 10/1993 | Olson et al. | |
| 5,293,642 A | 3/1994 | Lo | |
| 5,493,696 A | 2/1996 | Wolf | |
| 6,760,588 B2 | 7/2004 | Okajima et al. | |
| 6,785,254 B2 | 8/2004 | Korus et al. | |
| 6,816,070 B1 | 11/2004 | Hsu et al. | |
| 6,816,538 B2 | 11/2004 | Shuey et al. | |
| 6,882,856 B1 | 4/2005 | Alterman et al. | |
| 6,882,971 B2 | 4/2005 | Craner | |
| 6,999,783 B2 | 2/2006 | Toyryla et al. | |
| 7,702,349 B2 | 4/2010 | Harris et al. | |
| 7,848,738 B2 | 12/2010 | Diethorn | |
| 7,865,203 B2 | 1/2011 | Lei et al. | |
| 8,027,640 B2 | 9/2011 | Contreras et al. | |
| 8,103,300 B2 | 1/2012 | Gogic | |
| 8,249,601 B2 | 8/2012 | Emberson et al. | |
| 8,620,371 B2* | 12/2013 | Jorgensen | H04M 15/00 455/452.1 |
| 2003/0017836 A1* | 1/2003 | Vishwanathan | H04L 29/06 455/517 |
| 2003/0100326 A1* | 5/2003 | Grube | H04W 84/08 455/515 |
| 2003/0148779 A1* | 8/2003 | Aravamudan | H04L 29/06 455/519 |
| 2004/0190483 A1* | 9/2004 | Shahaf | H04W 84/08 370/347 |
| 2005/0101314 A1 | 5/2005 | Levi | |
| 2005/0124365 A1* | 6/2005 | Balasuriya | H04W 4/10 455/518 |
| 2005/0135348 A1* | 6/2005 | Staack | H04L 65/4061 370/353 |
| 2005/0232406 A1* | 10/2005 | Kauppinen | H04W 4/08 379/202.01 |
| 2006/0009249 A1* | 1/2006 | Fu | H04W 4/08 455/518 |
| 2006/0171351 A1* | 8/2006 | Wild | H04M 3/42221 370/328 |
| 2007/0021133 A1* | 1/2007 | Coulas | H04W 4/10 455/518 |
| 2007/0049314 A1* | 3/2007 | Balachandran | H04W 4/10 455/518 |
| 2007/0208807 A1* | 9/2007 | Jagannathan | H04L 65/4061 709/204 |
| 2009/0186605 A1* | 7/2009 | Apfel | G06F 3/0486 455/416 |
| 2009/0252084 A1* | 10/2009 | Fodor | H04L 12/189 370/328 |
| 2010/0016007 A1* | 1/2010 | Satake | H04W 4/08 455/518 |
| 2010/0159976 A1* | 6/2010 | Marocchi | H04W 4/08 455/519 |
| 2010/0165904 A1* | 7/2010 | Woodward | H04W 72/005 370/312 |
| 2010/0173624 A1* | 7/2010 | Esseling | H04W 4/10 455/422.1 |
| 2010/0234057 A1* | 9/2010 | Drozt | H04L 63/0407 455/518 |
| 2010/0274800 A1* | 10/2010 | Bogeby | H04W 4/10 707/769 |
| 2011/0319117 A1* | 12/2011 | Gonsalves | H04L 12/1822 455/519 |
| 2012/0003969 A1 | 1/2012 | Anderson et al. | |
| 2012/0026929 A1* | 2/2012 | Wang | H04W 72/005 370/312 |
| 2012/0026940 A1 | 2/2012 | Barbieri et al. | |
| 2012/0134282 A1* | 5/2012 | Tirronen | H04W 4/005 370/252 |
| 2012/0202428 A1* | 8/2012 | Mirbaha | H04L 12/185 455/41.2 |
| 2013/0028177 A1* | 1/2013 | Koskela | H04W 4/005 370/328 |
| 2013/0045759 A1 | 2/2013 | Smith | |
| 2013/0046841 A1* | 2/2013 | Park | H04W 4/08 709/206 |
| 2013/0109426 A1* | 5/2013 | Kerger | H04L 65/4061 455/518 |
| 2013/0143529 A1* | 6/2013 | Leppanen | H04W 4/08 455/411 |
| 2013/0171934 A1 | 7/2013 | Stankovska et al. | |
| 2013/0207829 A1 | 8/2013 | Kabler et al. | |
| 2013/0244712 A1* | 9/2013 | Kuzio | H04W 72/048 455/509 |
| 2013/0337771 A1* | 12/2013 | Klein | H04W 4/22 455/411 |
| 2014/0016507 A1* | 1/2014 | Han | H04W 28/18 370/254 |
| 2014/0032669 A1 | 1/2014 | Hughes | |
| 2014/0194062 A1* | 7/2014 | Palin | H04W 4/008 455/41.2 |
| 2014/0323048 A1* | 10/2014 | Kang | H04W 76/023 455/41.2 |
| 2015/0237670 A1* | 8/2015 | Mao | H04W 76/04 455/404.1 |
| 2015/0312781 A1* | 10/2015 | Chowdhary | H04W 24/04 455/424 |
| 2015/0359013 A1* | 12/2015 | Krizik | H04W 76/007 370/341 |
| 2017/0105102 A1* | 4/2017 | Smadi | H04W 4/08 |

FOREIGN PATENT DOCUMENTS

| | | |
|---|---|---|
| EP | 2009846 A1 | 12/2008 |
| EP | 2009936 A1 | 12/2008 |
| GB | 2459479 A | 10/2009 |
| WO | 2004046880 A2 | 6/2004 |
| WO | 2007101044 A2 | 9/2007 |
| WO | 2010135517 A1 | 11/2010 |

* cited by examiner

METHODS AND SYSTEMS FOR AUTOMATIC CREATION OF TALKGROUPS BASED ON RECEIVED SIGNAL STRENGTH INDICATOR (RSSI)

BACKGROUND OF THE INVENTION

Millions of people around the world make daily use of various computing and communication devices. Many of these devices can be described as wireless-communication devices (WCDs), in that they communicate with and via wireless-communication networks. Some WCDs communicate via cellular radio networks, some communicate via ad-hoc device-to-device connections (as part of, e.g., an ad-hoc network of such connections); such communication is referred to interchangeably in this disclosure at various times using adjectives such as direct, direct-mode, localized, point-to-point, peer-to-peer, and the like. Some WCDs are equipped, programmed, and configured to be able to communicate via both cellular networks and ad-hoc arrangements, perhaps in addition to being able to communicate according to one or more other configurations.

Examples of commonly used WCDs include cell phones, smartphones, tablets, notebook computers, laptop computers, and the like, and further include examples such as two-way radios that are often referred to by terms such as walkie-talkie. Some WCDs include the functionality of, e.g., both a smartphone and a two-way radio. And certainly many other examples of WCDs could be listed as well, as known to those having skill in the relevant art.

One context in which robust and reliable direct-mode communication is especially important is the public-safety context, where the immediacy and efficacy with which public-safety responders can communicate with one another are quite often determinative with respect to how positive the ultimate outcome of a given incident can be. It is desirable that such robust and reliable direct-mode communications can be readily established among two or more public-safety responders (i.e., allies) that are relatively near one another. Accordingly, there is a need for methods and systems for automatic creation of talk groups based on received signal strength indicator (RSSI).

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
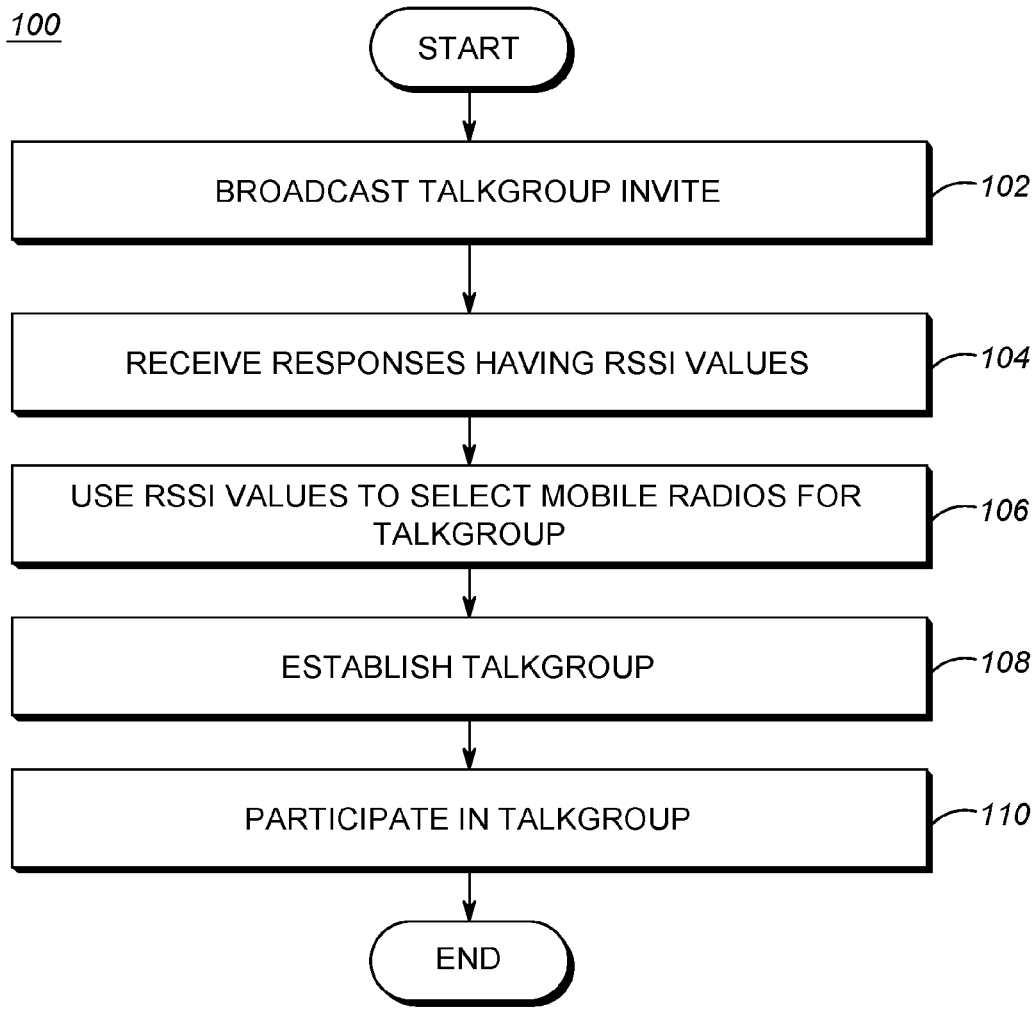
FIG. 1 depicts a first example process, in accordance with an embodiment.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Disclosed herein are methods and systems for automatic creation of talk groups based on RSSI. One embodiment takes the form of a process that includes a first mobile radio broadcasting a talkgroup invite. The process also includes the first mobile radio receiving respective talkgroup-invite responses from one or more other mobile radios. The process also includes the first mobile radio selecting one or more of the other mobile radios based at least in part, for each received talkgroup-invite response, on one or both of (i) an invite-RSSI value included in the talkgroup-invite response and associated with receipt of the talkgroup invite by the respective other mobile radio from which the talkgroup-invite response was received and (ii) a response-RSSI value associated with receipt by the first mobile radio of the respective talkgroup-invite response. The process also includes the first mobile radio establishing a talkgroup that includes the first mobile radio and the one or more selected other mobile radios. The process also includes the first mobile radio communicating as a participant in the established talkgroup.

Another embodiment takes the form of a process that includes a first mobile radio broadcasting a talkgroup invite. The process also includes the first mobile radio receiving respective talkgroup-invite responses from one or more other mobile radios, each talkgroup-invite response including an invite-RSSI value associated with receipt of the talkgroup invite by the respective other mobile radio from which the corresponding talkgroup-invite response was received. The process also includes the first mobile radio selecting one or more of the other mobile radios based at least in part on the one or more received invite-RSSI values. The process also includes the first mobile radio establishing a talkgroup that includes the first mobile radio and the one or more selected other mobile radios. The process also includes the first mobile radio communicating as a participant in the established talkgroup.

Another embodiment takes the form of a system that includes a first mobile radio, where the first mobile radio includes a first communication interface, a first processor, and first data storage containing instructions executable by the first processor for causing the first mobile radio to carry out at least the functions described in the preceding paragraphs. In at least one embodiment, these functions and perhaps one or more others are carried out by the first mobile radio in response to the first mobile radio attempting and failing to determine its location. In at least one embodiment, these functions and perhaps one or more others are carried out by the first mobile radio in response to the first mobile radio receiving a command to enter an emergency mode.

At least one embodiment takes the form of a system that includes the above-mentioned first mobile radio and one or more other mobile radios, each other mobile radio including a respective other communication interface, a respective other processor, and respective other data storage containing respective other instructions executable by the respective other processor for causing the respective other mobile radio to carry out a set of other-mobile-radio functions. The set of other-mobile-radio functions includes monitoring an air interface for talkgroup invites. The set of other-mobile-radio functions also includes receiving the broadcast talkgroup invite from the first mobile radio and responsively sending to the first mobile radio a corresponding talkgroup-invite response that includes a corresponding invite-RSSI value associated with receipt of the talkgroup invite by the corresponding other mobile radio. The set of other-mobile-radio functions also includes communicating as a participant in the established talkgroup. In at least one such embodiment, the other communication interface includes a first receiver and a second receiver, and monitoring the air interface for talkgroup invites includes using the second receiver to monitor the air interface for talkgroup invites.

Another embodiment takes the form of a system that includes a first mobile radio configured to broadcast an invite to participate in a talkgroup and one or more other mobile radios, each other mobile radio configured to join the talkgroup in response to measuring an RSSI at or above an RSSI threshold with respect to their receipt of the invite from the first mobile radio. In at least one such embodiment, the invite includes the RSSI threshold.

Moreover, any of the variations and permutations described in the ensuing paragraphs and anywhere else in this disclosure can be implemented with respect to any embodiments, including with respect to any method embodiments and with respect to any system embodiments.

In at least one embodiment, broadcasting the talkgroup invite includes broadcasting the talkgroup invite on a base-station downlink frequency or a dedicated direct-mode channel.

In at least one embodiment, selecting one or more of the other mobile radios based at least in part on the one or more received invite-RSSI values includes only selecting mobile radios whose invite-RSSI values indicate receipt of the talkgroup invite at or above an RSSI threshold. For brevity and clarity of presentation, and not by way of limitation, embodiments in which selecting one or more of the other mobile radios based at least in part on the one or more received invite-RSSI values includes only selecting mobile radios whose invite-RSSI values indicate receipt of the talkgroup invite at or above the RSSI threshold are referred to below as "RSSI-threshold embodiments."

In at least one RSSI-threshold embodiment, the received invite-RSSI values include RSSI-measurement indicators; in at least one such RSSI-threshold embodiment, the process further includes (i) the first mobile radio comparing the RSSI-measurement indicators to the RSSI threshold and (ii) the first mobile radio only identifying mobile radios whose RSSI-measurement indicators meet or exceed the RSSI threshold as being mobile radios whose invite-RSSI values indicate receipt of the talkgroup invite at or above the RSSI threshold.

In at least one RSSI-threshold embodiment, the received invite-RSSI values include Boolean indicators reflecting whether the corresponding mobile radios received the talkgroup invite at or above the RSSI threshold; in at least one such RSSI-threshold embodiment, the first mobile radio only identifies mobile radios whose Boolean indicators are true as being mobile radios whose invite-RSSI values indicate receipt of the talkgroup invite at or above the RSSI threshold; in at least one such RSSI-threshold embodiment, the talkgroup invite includes the RSSI threshold.

In at least one RSSI-threshold embodiment, the one or more selected other mobile radios make up a proper subset of the mobile radios whose invite-RSSI values indicate receipt of the talkgroup invite at or above the RSSI threshold.

In at least one RSSI-threshold embodiment, selecting one or more of the other mobile radios based at least in part on the one or more received invite-RSSI values also includes only selecting mobile radios that satisfy one or more additional talkgroup qualifications; in at least one such RSSI-threshold embodiment, the talkgroup invite specifies one or more of the additional talkgroup qualifications; in at least one such RSSI-threshold embodiment, the one or more additional talkgroup qualifications include one or more of agency identifier, subscriber type, current talkgroup, altitude, and a list of one or more whitelisted subscriber identifiers; in at least one such RSSI-threshold embodiment, one or both of the RSSI threshold and one or more of the additional talkgroup qualifications are modifiable via a user interface of the first mobile radio.

In at least one RSSI-threshold embodiment, the first mobile radio presents via a user interface a plurality of identifiers of mobile radios whose invite-RSSI values indicate receipt of the talkgroup invite at or above the RSSI threshold; and the first mobile radio receives via the user interface one or more user selections of one or more of the presented identifiers; in at least one such RSSI-threshold embodiment, selecting one or more of the other mobile radios based at least in part on the one or more received invite-RSSI values includes selecting the one or more mobile radios corresponding to the received one or more user selections.

In at least one embodiment, establishing the talkgroup includes adding the one or more selected other mobile radios to a current talkgroup of the first mobile radio. In at least one embodiment, the talkgroup is a new talkgroup.

In at least one embodiment, the first mobile radio also carries out the function of measuring the respective response-RSSI values.

In at least one embodiment, the first mobile radio measures response-RSSI values associated with receipt by the first mobile radio of the respective talkgroup-invite responses, and the selection of one or more of the other mobile radios based at least in part on the one or more received invite-RSSI values includes selecting one or more of the other mobile radios based at least in part on the one or more received invite-RSSI values and at least in part on the one or more measured response-RSSI values.

Another embodiment takes the form of a process that includes a first mobile radio broadcasting a talkgroup invite. The process also includes the first mobile radio receiving respective talkgroup-invite responses from one or more other mobile radios that received the talkgroup invite. The process also includes the first mobile radio measuring respective response-RSSI values associated with receipt by the first mobile radio of the respective talkgroup-invite responses. The process also includes the first mobile radio selecting one or more of the other mobile radios based at least in part on the one or more measured response-RSSI values. The process also includes the first mobile radio establishing a talkgroup that includes the first mobile radio and the one or more selected other mobile radios. The process also includes the first mobile radio communicating as a participant in the established talkgroup.

Before proceeding with this detailed description, it is noted that the entities, connections, arrangements, and the like that are depicted in—and described in connection with—the various figures are presented by way of example and not by way of limitation. As such, any and all statements or other indications as to what a particular figure "depicts," what a particular element or entity in a particular figure "is" or "has," and any and all similar statements—that may in isolation and out of context be read as absolute and therefore limiting—can only properly be read as being constructively preceded by a clause such as "In at least one embodiment, . . . " And it is for reasons akin to brevity and clarity of presentation that this implied leading clause is not repeated ad nauseam in this detailed description.

Figure 12:
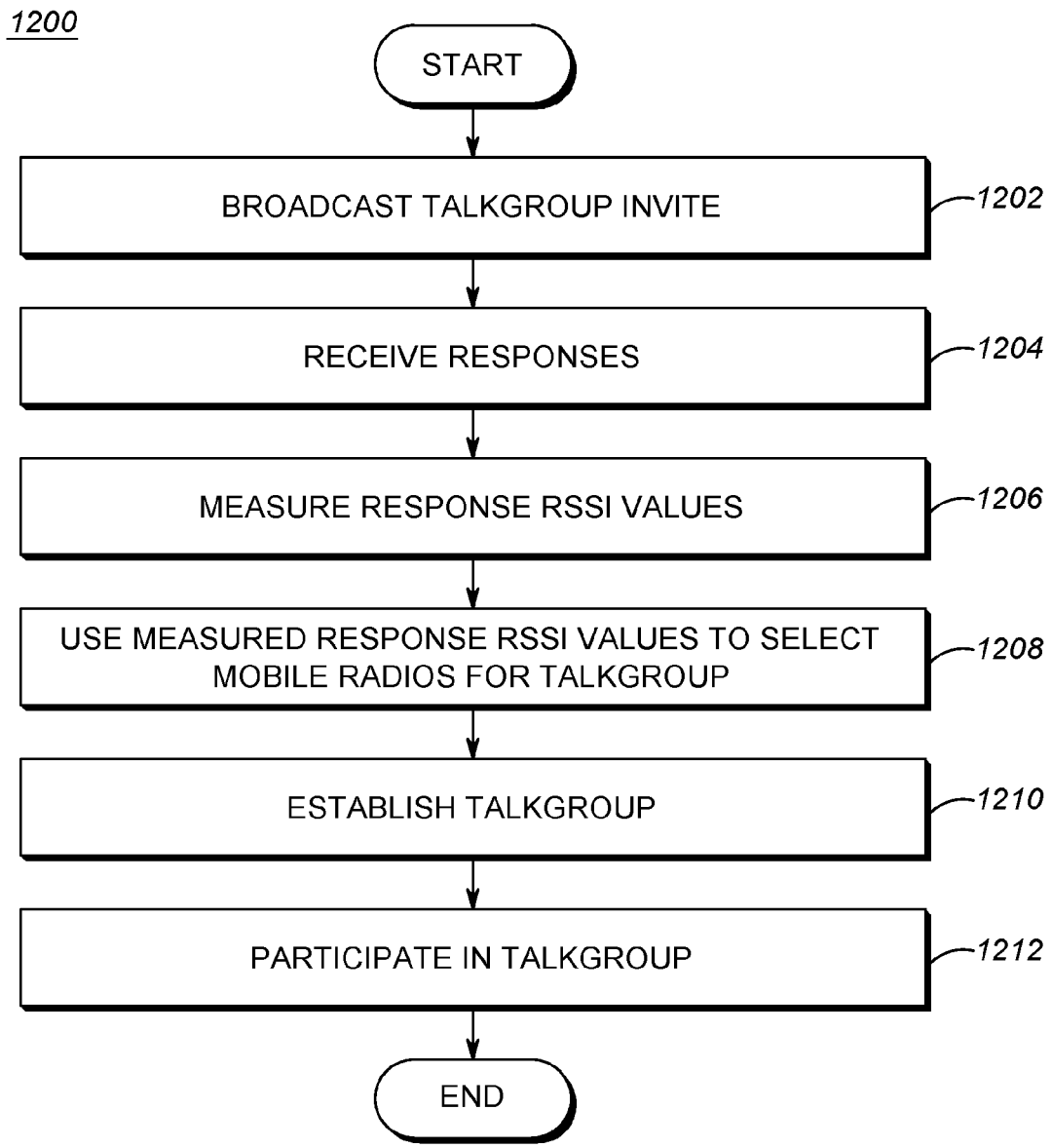
FIG. 12 depicts a second example process, in accordance with an embodiment.

Moreover, it is further noted that, as stated above, at least one embodiment involves the first mobile radio selecting (for a talkgroup) one or more of the other mobile radios based at least in part, for each received talkgroup-invite response, on one or both of (i) an invite-RSSI value included in the talkgroup-invite response and associated with receipt of the talkgroup invite by the respective other mobile radio from which the talkgroup-invite response was received and (ii) a response-RSSI value associated with receipt by the first mobile radio of the respective talkgroup-invite response. As such, some embodiments involve the first mobile radio basing its selection at least in part on the former and not the latter, some embodiments involve the first mobile radio basing its selection at least in part on the latter and not the former, and some embodiments involve the first mobile radio basing its selection at least in part on the former and at least in part on the latter. In at least some embodiments in which the first mobile radio does not base its selection at least in part on the former, one or more of the received talkgroup-invite responses do not include an invite-RSSI value. In the ensuing description, FIG. 1 depicts a process in which the first mobile radio bases its selection at least in part on the former, while FIG. 12 depicts a process in which the first mobile radio bases its selection at least in part on the latter. These are by way of example and not limitation.

FIG. 1 depicts a first example process, in accordance with an embodiment. In particular, FIG. 1 depicts a process 100 that in at least one embodiment is carried out by a mobile radio, referred to below in connection with the process 100 as the "first mobile radio." It is noted that the process 100 involves the first mobile radio communicating with what are referred to in this disclosure as "one or more other mobile radios." The description of the process 100 as being carried out by a mobile radio is provided by way of example, as other suitably equipped and programmed devices could carry out the process 100, as known to those in the art.

At step 102, the first mobile radio broadcasts a talkgroup invite. At step 104, the first mobile radio receives respective talkgroup-invite responses from one or more other mobile radios; each such talkgroup-invite response includes an invite-RSSI value that is associated with receipt of the talkgroup invite by the respective other mobile radio from which the corresponding talkgroup-invite response was received (by the first mobile radio). At step 106, the first mobile radio selects one or more of the other mobile radios based at least in part on the one or more received invite-RSSI values. At step 108, the first mobile radio establishes a talkgroup that includes the first mobile radio and the selected one or more other mobile radios. At step 110, the first mobile radio communicates as a participant in the established talkgroup. Each of these steps is discussed more fully below in connection with one or more of the ensuing figures.

Figure 2:
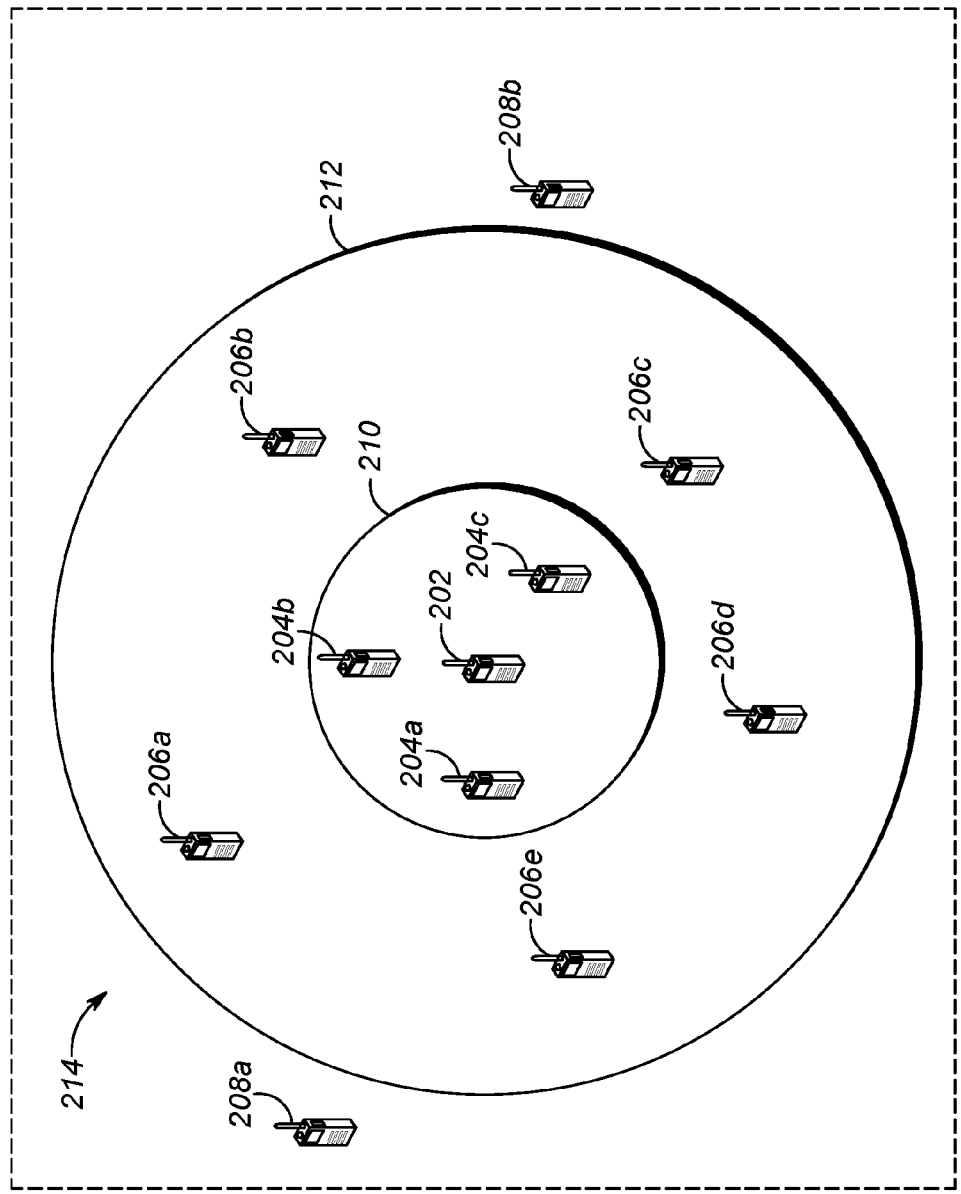
FIG. 2 depicts a first example arrangement of WCDs, in accordance with an embodiment.

FIG. 2 depicts a first example arrangement of WCDs, in accordance with an embodiment. In at least one embodiment, the first mobile radio that is described herein as carrying out the process 100 is the mobile radio 202 that is first depicted near the center of the example arrangement 200 of WCDs (in this case, mobile radios) that is depicted in FIG. 2. As can be seen in FIG. 2, the example arrangement 200 includes a central region 210, a donut-shaped region 212 (that does not include the region 210), and an outermost region 214 (that includes neither the central region 210 nor the donut-shaped region 212). The mobile radio 202 is located in the central region 210, along with mobile radios 204a, 204b, and 204c. Located in the donut-shaped region 212 are mobile radios 206a, 206b, 206c, 206d, and 206e. Located in the outermost region 214 are mobile radios 208a and 208b. In the parlance of this disclosure, the mobile radio 202 corresponds with the "first mobile radio," while the mobile radios 204a-c, 206a-e, and 208a-b corresponds with the "other" mobile radios.

At step 102, the mobile radio 202 broadcasts a talkgroup invite, which may take the form of any suitable invite message or signal that conveys to one or more recipients that the originating mobile radio 202 is attempting to establish a talkgroup, and is inviting one or more other mobile radios to participate in that talkgroup. In at least one embodiment, the mobile radio 202 broadcasts the talkgroup invite on a base-station downlink frequency. In at least one embodiment, the mobile radio 202 broadcasts the talkgroup invite on a dedicated direct-mode channel. And certainly other options could be listed.

In an example scenario, the talkgroup invite that is broadcast by the mobile radio 202 at step 102 is received by the mobile radios 204a-c (that are in the central region 210 along with the mobile radio 202) and the mobile radios 206a-e (that are in the donut-shaped region 212), and is not received by either of the mobile radios 208a-b (that are in the outermost region 214). It is noted that a given mobile radio may not receive a given talkgroup invite (or other message, signal, communication, or the like) in a given instance for any one or more of a number of reasons, some examples of which include the given mobile radio being turned off, the given mobile radio being too far away to detect the broadcast of the invite, and the given mobile radio being physically and/or electromagnetically shielded from the broadcast of the invite. And certainly other factors could be involved in different instances.

At step 104, the mobile radio 202 receives a respective talkgroup-invite response from each of the mobile radios 204a-c and 206a-e. As described, in this example, those are the eight "other" mobile radios that received the talkgroup invite that was broadcast by the "first" mobile radio 202 at step 102. In at least one embodiment, each mobile radio that receives the talkgroup invite measures an RSSI value that reflects the signal strength (i.e., power) at which that respective mobile radio received the talkgroup invite broadcast by the mobile radio 202. It is noted that the measuring of RSSI values with respect to the receipt of messages and signals is within the skill of those in the relevant art. And other things being more or less equal, it would be expected that, with respect to their receipt of the talkgroup invite broadcast by the mobile radio 202, each of the RSSI values measured by the mobile radios 204a-c would exceed each of the RSSI values measured by the mobile radios 206a-e.

Moreover, in at least one embodiment, each mobile radio 204a-c and 206a-e that receives the talkgroup invite sends to the mobile radio 202 a respective talkgroup-invite response that includes an invite-RSSI value that is associated with that mobile radio's receipt of the talkgroup invite (and associated measurement of an RSSI value). As described further below, the invite-RSSI values in the talkgroup-invite responses could take different forms, some examples including actual measured values (in, e.g., decibels (dB)), normalized measured values, Boolean indicators as to whether their measured RSSI value met or exceeded an RSSI threshold, and/or the like.

As described above, step 102 relates to the mobile radio 202 broadcasting a talkgroup invite. And while additional steps are described below with respect to selecting mobile radios for participation in a talkgroup (step 106), establishing that talkgroup (step 108), and participating in that established talkgroup (step 110), it is logical at this point in this disclosure to first briefly discuss—in the ensuing paragraph—an example of an established talkgroup.

Figure 3:
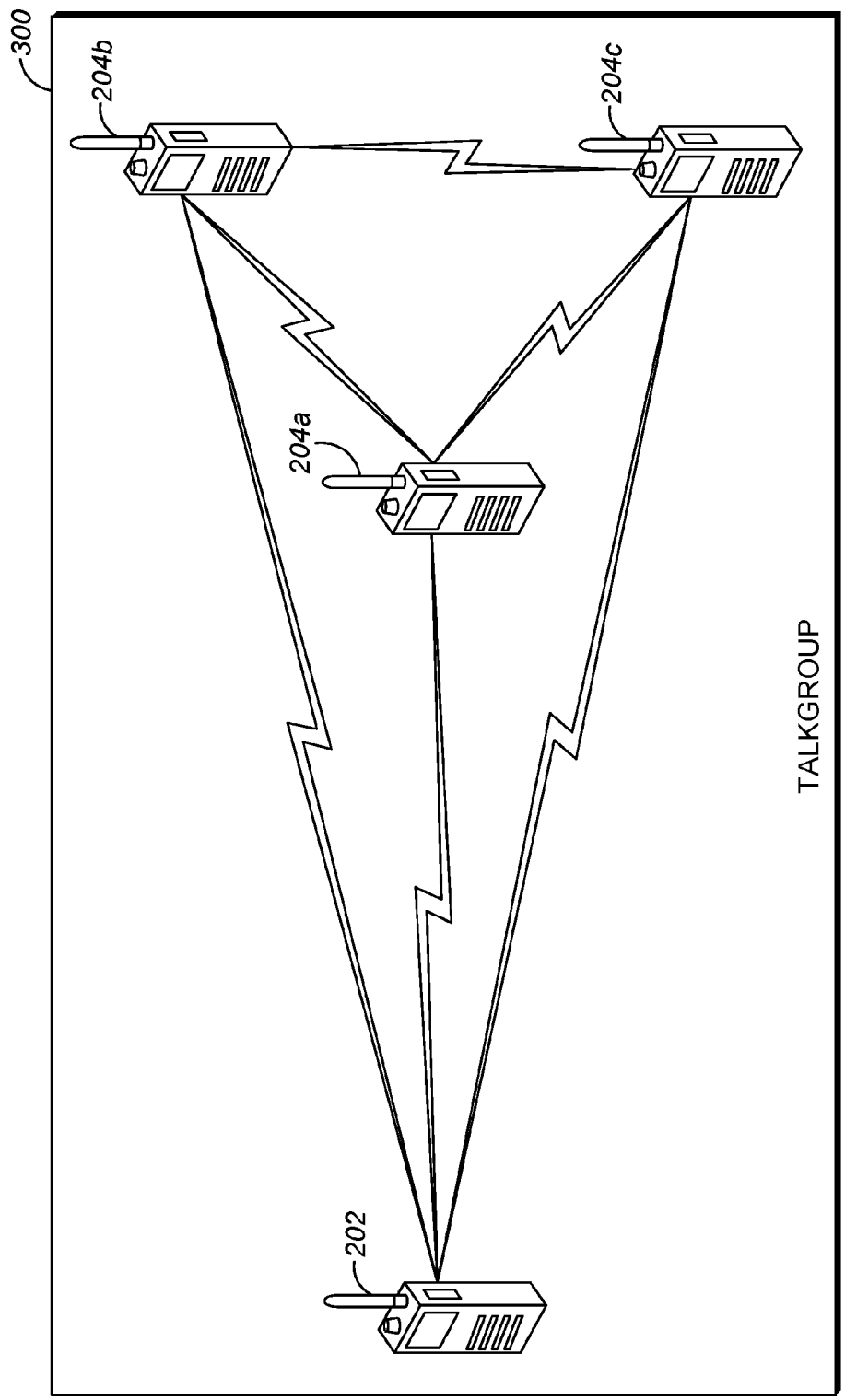
FIG. 3 depicts an example talkgroup, in accordance with an embodiment.

FIG. 3 depicts an example talkgroup, in accordance with an embodiment. In particular, FIG. 3 depicts an example talkgroup 300 that includes the mobile radios 202, 204a, 204b, and 204c. In the example that is depicted in FIG. 3, each of the mobile radios in the talkgroup has a wireless communication link with each of other mobile radios in the talkgroup, as is depicted by the five lightning-bolt graphics in FIG. 3. And while the depicted example shows direct connections between every pair of mobile radios in the talkgroup 300, other example talkgroups involving these same four mobile radios might involve indirect communication between two or more of the mobile radios in the talkgroup, via one or more intermediate mobile radios. Such arrangements are known to those having skill in the relevant art. Furthermore, the mobile radios 202 and 204a-c may participate in the example talkgroup 300 according to any wireless-communication protocol deemed suitable by those of skill in the relevant art for a given implementation or in a given context.

Returning now to the example process 100, at step 106, the mobile radio 202 selects (for participation in a talkgroup) one or more of the other mobile radios based at least in part on the one or more invite-RSSI values that were respectively included in the one or more talkgroup-invite responses that were received by the mobile radio 202 at step 104. As described above, in an example scenario, the mobile radio 202 receives a respective talkgroup-invite response from each of the mobile radios 204a-c and 206a-e, and each of those talkgroup-invite responses includes a respective invite-RSSI value that is associated with the corresponding mobile radio's receipt of the talkgroup invite from the mobile radio 202 (and associated measurement of an RSSI value).

In at least one embodiment, carrying out step 106 involves only selecting mobile radios whose invite-RSSI values indicate receipt of the talkgroup invite at or above an RSSI threshold. These mobile-radio-by-mobile-radio determinations (as to whether their associated invite-RSSI values indicate receipt of the talkgroup invite at or above an RSSI threshold) could all be made by the mobile radio 202 (as shown and discussed below by way of example in connection with FIG. 4), or instead could be made individually by each respective other mobile radio (as shown and discussed below by way of example in connection with FIG. 5); and other possibilities could be listed, including various different combinations of those approaches.

Figure 4:
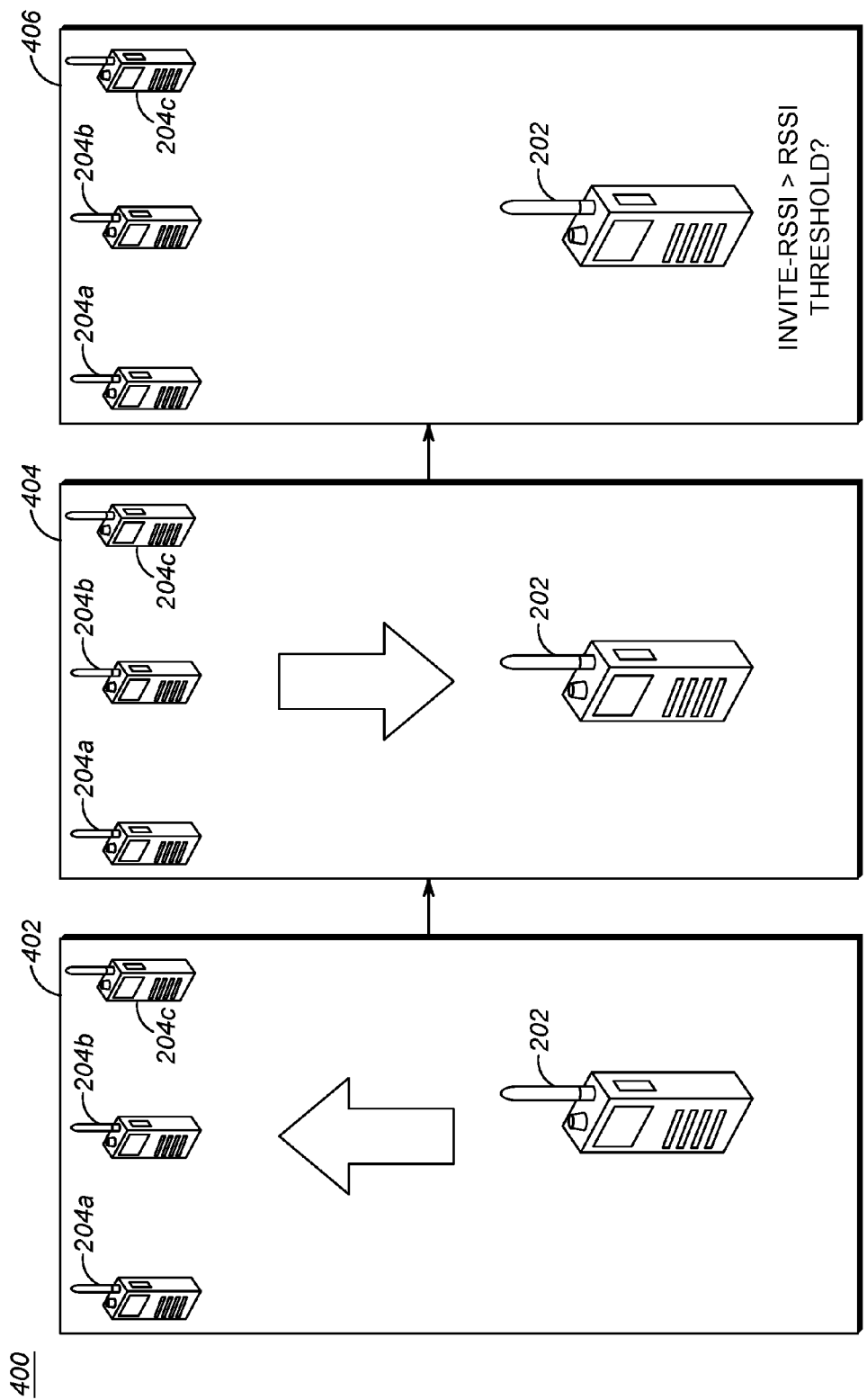
FIG. 4 depicts a first example messaging-and-processing sequence, in accordance with an embodiment.

FIG. 4 depicts a first example messaging-and-processing sequence, in accordance with an embodiment. In particular, FIG. 4 depicts an example messaging-and-processing sequence 400 that includes three sequential time periods 402, 404, and 406. In time period 402, the mobile radio 202 broadcasts a talkgroup invite that is depicted in FIG. 4 as being received by the other mobile radios 204a-c. As noted above, in the described example scenario, the talkgroup invite is also received by the other mobile radios 206a-c, though (again, in this example scenario) these mobile radios 206a-c do not end up being selected by the mobile radio 202 for participation in a talkgroup.

In time period 404, the mobile radio 202 receives a talkgroup-invite response (each including a respective invite-RSSI value) from each of the mobile radios 204a-c. In time period 406, the mobile radio 202 selects the mobile radios 204a-c for participation in a talkgroup at least in part by determining that each of the invite-RSSI values from the mobile radios 204a-c meets or exceeds an RSSI threshold. The other mobile radios 204a-c may or may not be aware of the value of that RSSI threshold. Moreover, the invite RSSI values in the example depicted in FIG. 4 could be actual measured values (in, e.g., dB), normalized measured values, and/or any other suitable values that could be compared by the mobile radio 202 with a suitable RSSI threshold.

Figure 5:
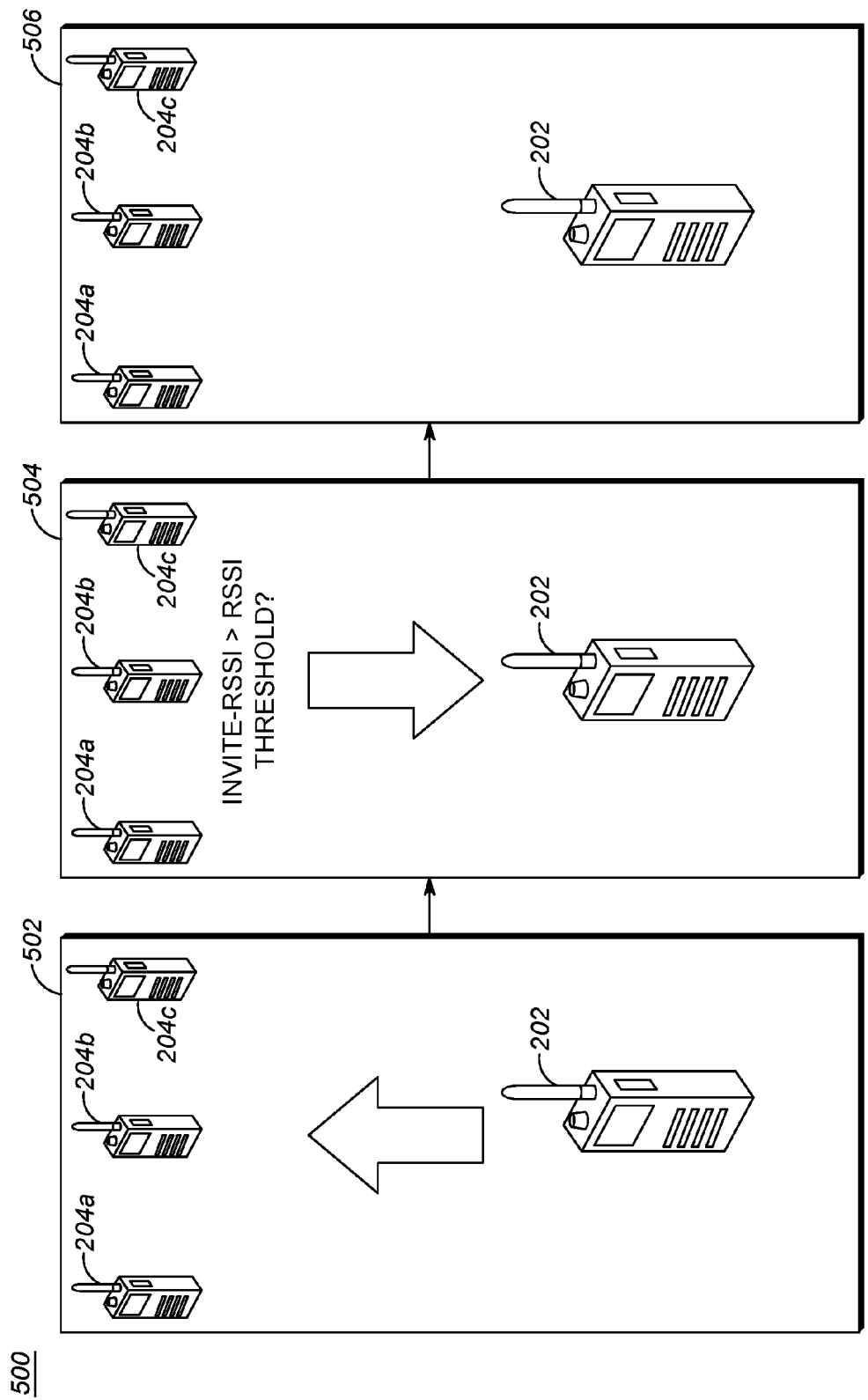
FIG. 5 depicts a second example messaging-and-processing sequence, in accordance with an embodiment.

FIG. 5 depicts a second example messaging-and-processing sequence, in accordance with an embodiment. In particular, FIG. 5 depicts an example messaging-and-processing sequence 500 that includes three sequential time periods 502, 504, and 506. In time period 502 (as was the case in time period 402), the mobile radio 202 broadcasts a talkgroup invite that is depicted in FIG. 5 as being received by the other mobile radios 204a-c. As noted above, in the described example scenario, the talkgroup invite is also received by the other mobile radios 206a-c, though (again, in the described example scenario) these mobile radios 206a-c do not end up being selected by the mobile radio 202 for participation in a talkgroup.

In time period 504 (as was the case in time period 404), the mobile radio 202 receives a talkgroup-invite response (each including a respective invite-RSSI value) from each of the mobile radios 204a-c. Unlike in time period 404, however, in time period 504, each of the mobile radios 204a-c compares its measured RSSI value with the RSSI threshold, and then may send the mobile radio 202 a respective invite-RSSI value that is as simple as (or at least includes) a Boolean indicator of whether that mobile radio's measured RSSI value met or exceeded the RSSI threshold. In this example, each of the mobile radios 204a-c would send a "true" indication, while (though not pictured), each of the mobile radios 206a-e would send a "false" indication (or perhaps send no indication at all).

In time period 506, the mobile radio 202 selects the mobile radios 204a-c for participation in a talkgroup at least in part by determining that each of the invite-RSSI values from the mobile radios 204a-c was a "true" indication. In embodiments such as these, the RSSI threshold could be already known to—i.e., stored by—each of the mobile radios 204a-c, or could be included by the mobile radio 202 in the broadcasted talkgroup invite (or another message), among other possible implementations.

In the examples described above in connection with FIG. 4 and FIG. 5, only those mobile radios whose invite-RSSI values indicated receipt of the talkgroup invite at or above the RSSI threshold were selected for participation in the talkgroup, and no such mobile radio was not selected for participation in the talkgroup. This was described by way of example and not limitation; to wit, in some embodiments, one or more mobile radios whose invite-RSSI values indicate receipt of the talkgroup invite at or above the RSSI threshold are not selected for participation in the talkgroup. In other words, in at least one embodiment, the one or more mobile radios that are selected for participation in the talkgroup make up a proper subset (i.e., one or more but not all) of the mobile radios whose invite-RSSI values indicate receipt of the talkgroup invite at or above the RSSI threshold. Such a scenario is described below.

Figure 6:
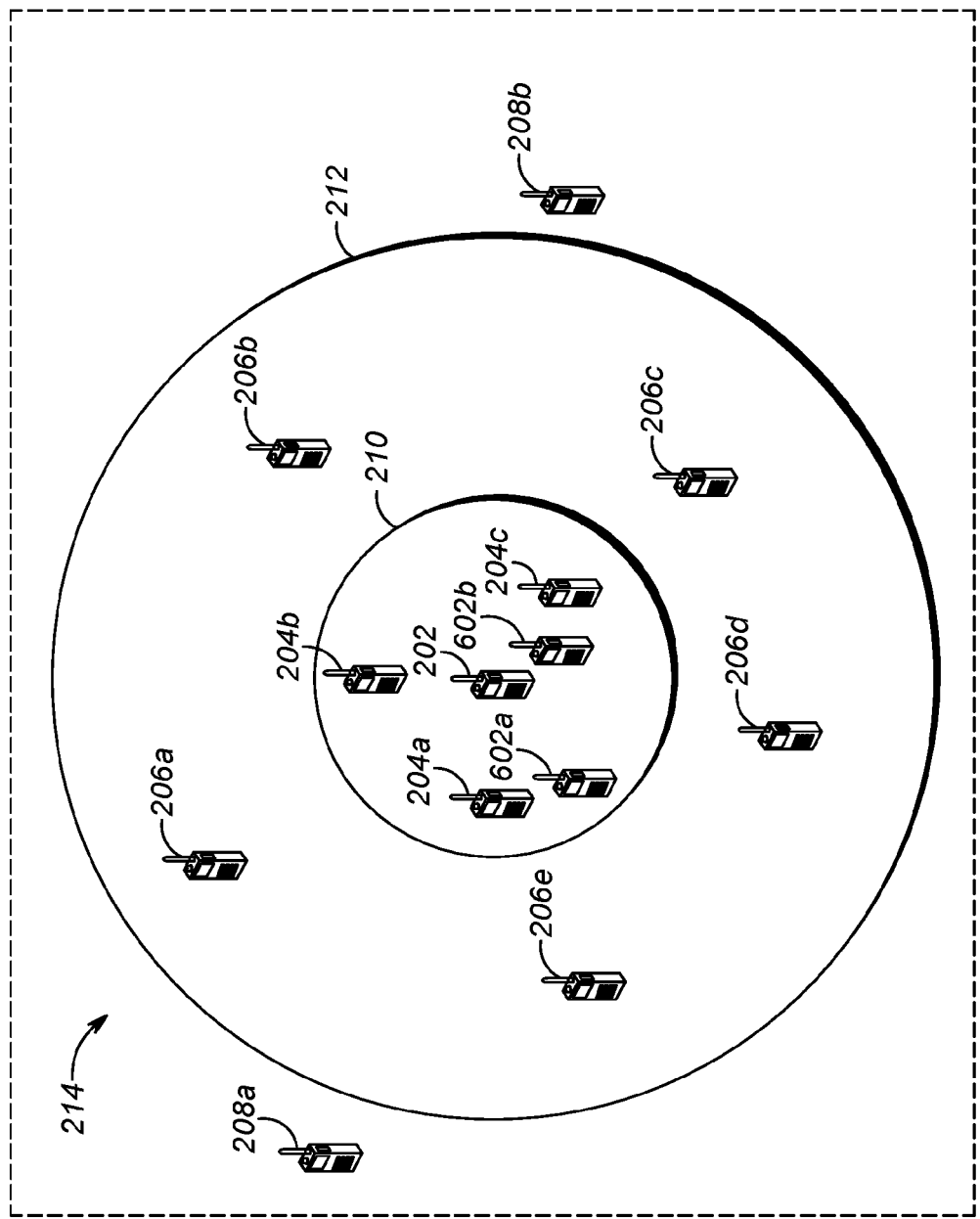
FIG. 6 depicts a second example arrangement of WCDs, in accordance with an embodiment.

FIG. 6 depicts a second example arrangement of WCDs, in accordance with an embodiment. In particular, FIG. 6 depicts an example arrangement 600 that is quite similar to the example arrangement 200 of FIG. 2, but for the additional presence in the central region 210 of two additional "other" mobile radios 602a and 602b. In this example, the mobile radios 602a-b, like the mobile radios 204a-c, send to the mobile radio 202 a talkgroup-invite response that includes an invite-RSSI value indicating that each of those two mobile radios 602a-b received the talkgroup invite at or above the RSSI threshold. But while the mobile radios 204a-c are selected for participation in the talkgroup, the mobile radios 602a-b are not.

This is an example of an embodiment in which the mobile radio 202 only selects for participation in the talkgroup mobile radios that (i) send invite-RSSI values indicating receipt of the talkgroup invite at or above the RSSI threshold and (ii) satisfy one or more additional talkgroup qualifications, which may include one or more of an agency identifier (e.g., associated with police, fire, ambulance, or the like), a subscriber type (e.g., minimum rank, uniformed officer, detective, and/or the like), participation (or membership, or the like) in another talkgroup, altitude (e.g., to identify close allies that are on the same or an adjoining floor of a building), and being on a list of one or more whitelisted mobile radios, among numerous other possible additional talkgroup qualifications that could be listed.

In some embodiments, one or more of the additional talkgroup qualifications are sent by the mobile radio 202 to other mobile radios in the talkgroup invite and/or one or more other messages deemed suitable for this purpose by those of skill in the relevant art. In at least one embodiment, one or more of the additional talkgroup qualifications are selectable and/or modifiable via a user interface of the mobile radio 202. And other embodiments involving a user interface of the mobile radio 202 are discussed below.

Figure 7:
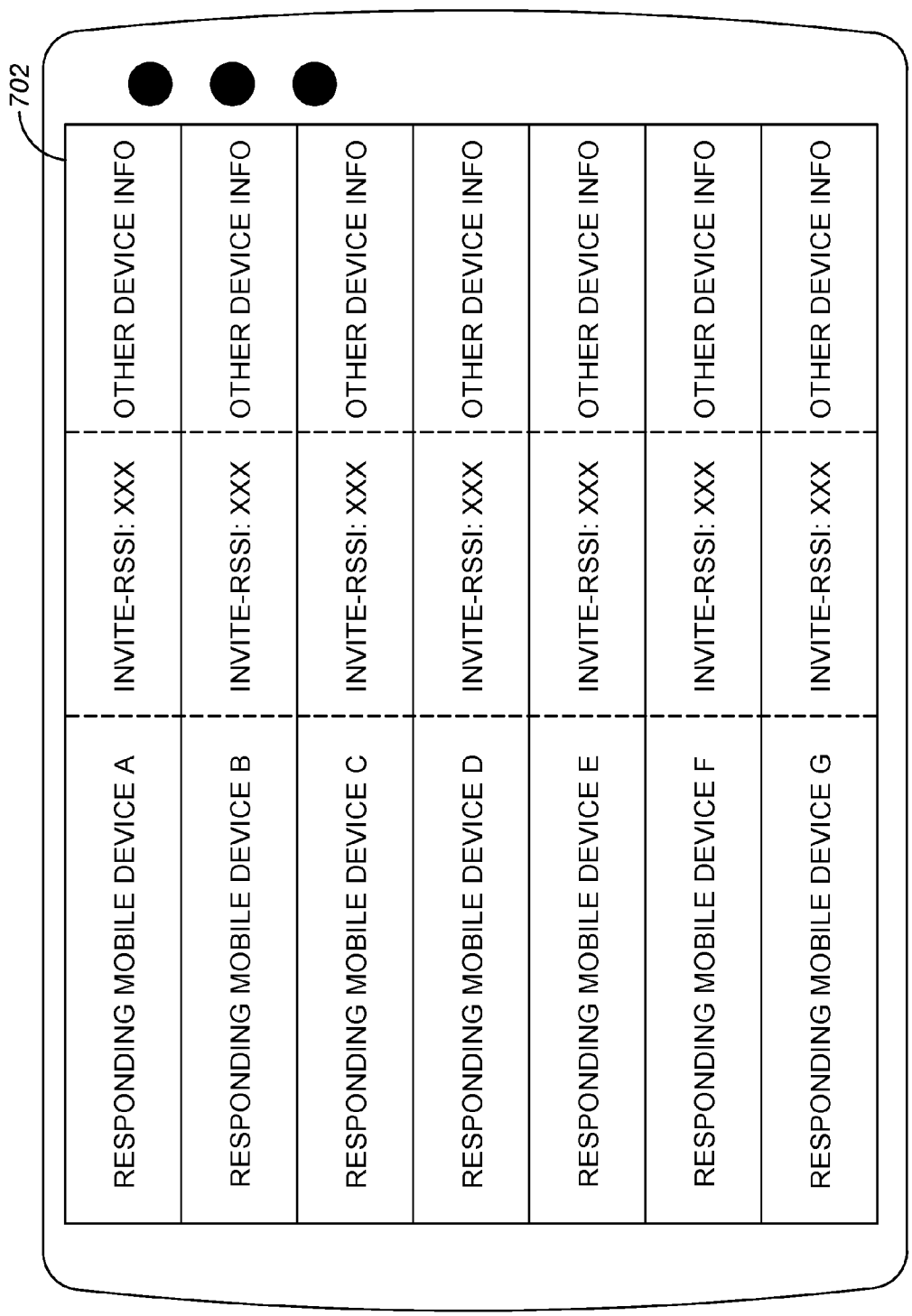
FIG. 7 depicts an example user interface, in accordance with an embodiment.

FIG. 7 depicts an example user interface, in accordance with an embodiment. In particular, FIG. 7 depicts an example user interface 702 of the mobile radio 202. As can be seen in the example that is depicted in FIG. 7, the mobile radio 202 has presented via the user interface 702 a plurality of identifiers of mobile radios whose invite-RSSI values indicate receipt of the talkgroup invite at or above the RSSI threshold. Each row includes an identifier of a mobile radio in the left-hand column, a corresponding invite-RSSI value (e.g., in dB, true/false, and/or the like) in the center column, and any other relevant device information in the right-hand column. It is noted that the center and right-hand columns are not present in all embodiments in which the first mobile radio presents via a user interface a plurality of identifiers of mobile radios whose invite-RSSI values indicate receipt of the talkgroup invite at or above the RSSI threshold; in some embodiments, only the left-hand column and the center column are displayed; in some embodiments, only the left-hand column is displayed. And certainly arrangements other than rows and columns could be used, as deemed suitable by those of skill in the art.

In at least one embodiment in which the first mobile radio presents via a user interface a plurality of identifiers of mobile radios whose invite-RSSI values indicate receipt of the talkgroup invite at or above the RSSI threshold, the first mobile radio also receives via the user interface 702 one or more user selections of one or more of the presented identifiers; and in at least one such embodiment, carrying out step 106 (i.e., selecting one or more other mobile radios for participation in a talkgroup) involves selecting (for participation in the talkgroup) each mobile radio corresponding to a user selection. In some examples, the mobile radio 202 lists the presented identifiers in descending order of invite-RSSI value, though certainly many other display approaches could be implemented, as deemed suitable by those of skill in the art. In at least one embodiment, the mobile radio 202 presents via a user interface an adjustable indicator of RSSI threshold needed to be selected for participation in the talkgroup, and further presents a real-time indication of other mobile radios that meet or exceed the currently specified RSSI-threshold level. And certainly other examples could be listed.

Moreover, in at least one embodiment, the mobile radio 202 makes RSSI measurements regarding its receipt of the respective talkgroup-invite responses that it receives from various respective other mobile radios, and bases its selection of other mobile radios for participation in a talkgroup not only on the invite-RSSI values in the respective talkgroup-invite responses, but also on the RSSI at which the mobile radio 202 measures its receipt of those talkgroup-invite responses. Such an approach reflects that some embodiments assess both directions of a given two-way communication link in making selections of mobile radios for participation in talkgroups. A depiction of at least one such embodiment is described below.

Figure 8:
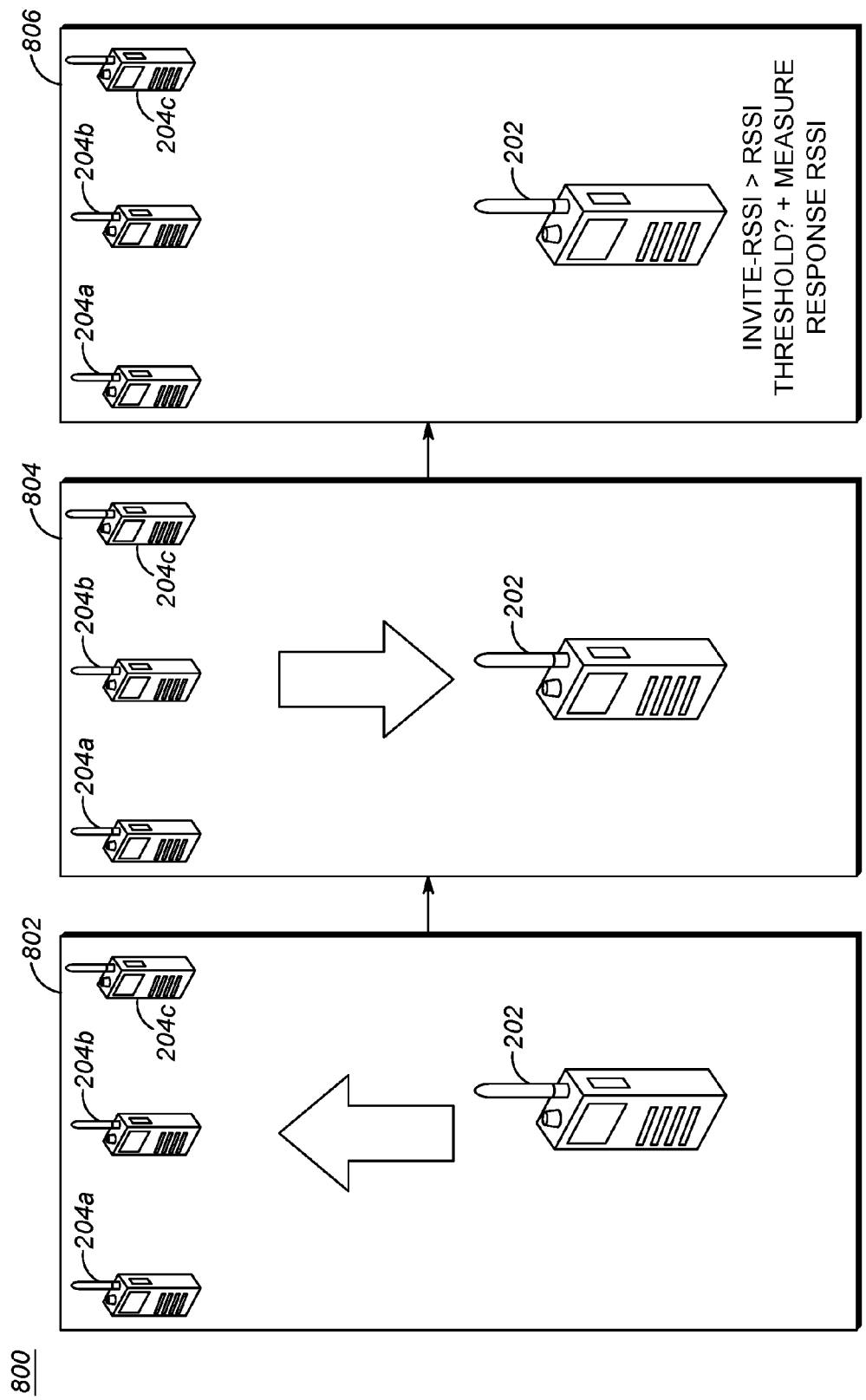
FIG. 8 depicts a third example messaging-and-processing sequence, in accordance with an embodiment.

FIG. 8 depicts a third example messaging-and-processing sequence, in accordance with an embodiment. In particular, FIG. 8 depicts an example messaging-and-processing sequence 800 that is quite similar to the example messaging-and-processing sequence 400 that is described in connection with FIG. 4. In time period 802 (as was the case in time period 402), the mobile radio 202 broadcasts a talkgroup invite that is depicted in FIG. 8 as being received by the other mobile radios 204a-c. As noted above, in the described example scenario, the talkgroup invite is also received by the other mobile radios 206a-c, though (again, in this example scenario) these mobile radios 206a-c do not end up being selected by the mobile radio 202 for participation in a talkgroup. In time period 804 (as was the case in time period 404), the mobile radio 202 receives a talkgroup-invite response (each including a respective invite-RSSI value) from each of the mobile radios 204a-c. Indeed, the example sequence 800 differs from the example sequence 400 only in that, in the third time period 806 in FIG. 8 (as compared with the third time period 406 in FIG. 4), the mobile radio 202 not only assesses the various invite-RSSI values from the various responding mobile radios against the RSSI threshold, but also measures and considers (as part of its selection criteria) its own RSSI values with respect to its receipt of the various talkgroup-invite responses; in so doing, the mobile radio 202 could compare its own measured RSSI values with the same RSSI threshold or with one of a different value. Moreover, instead of or in addition to the sequence 400 of FIG. 4, the sequence 500 of FIG. 5 (or any other embodiment) could have been similarly adapted for illustrative purposes into a depiction similar to that of FIG. 8.

Returning to FIG. 1, at step 108, the mobile radio 202 establishes a talkgroup that includes itself and the one or more other mobile radios selected at step 106. In at least one embodiment, step 108 involves adding the one or more selected other mobile radios to an existing talkgroup (i.e., a current talkgroup in which the mobile radio 202 is a participant). In at least one embodiment, step 108 involves creating a new talkgroup. At step 110, the mobile radio 202 communicates as a participant in the established talkgroup, including transmitting and/or receiving bearer data related to the established talkgroup, and also transmitting and/or receiving any necessary signaling data related to the established talkgroup.

As mentioned above, one embodiment takes the form of a system that includes a first mobile radio and one or more other mobile radios. In accordance with this embodiment, the first mobile radio is configured to broadcast an invite to participate in a talkgroup. Further in accordance with this embodiment, each other mobile radio is configured to join the talkgroup in response to measuring an RSSI at or above an RSSI threshold with respect to their receipt of the invite from the first mobile radio. In at least one such embodiment, the invite includes the RSSI threshold. Moreover, a method embodiment includes a first mobile radio broadcasting an invite to participate in a talkgroup, and further includes one or more other mobile radios joining the talkgroup in response to measuring an RS SI at or above an RSSI threshold with respect to their receipt of the invite from the first mobile radio. In at least one such embodiment, the invite includes the RSSI threshold.

Figure 9:
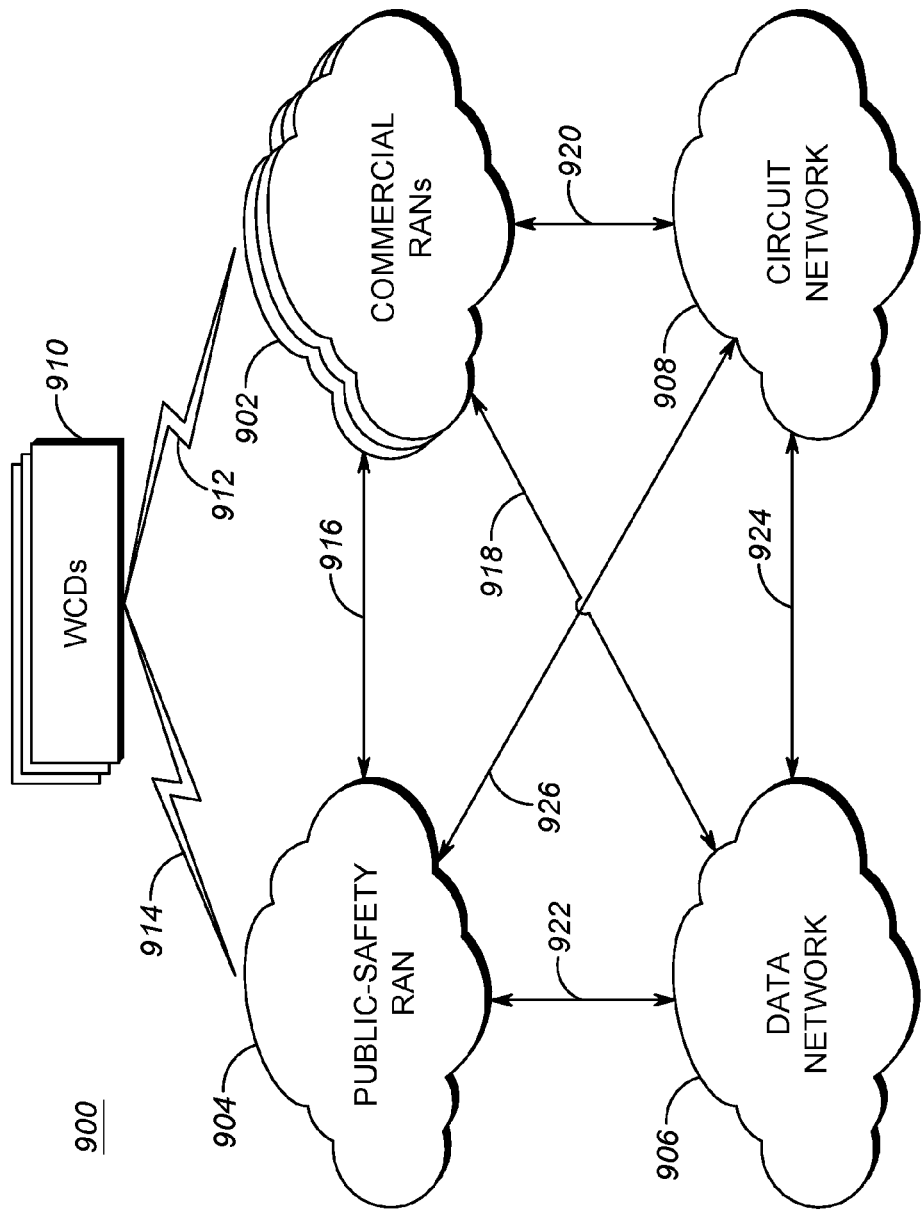
FIG. 9 depicts an example communication system, in accordance with an embodiment.
Figure 10:
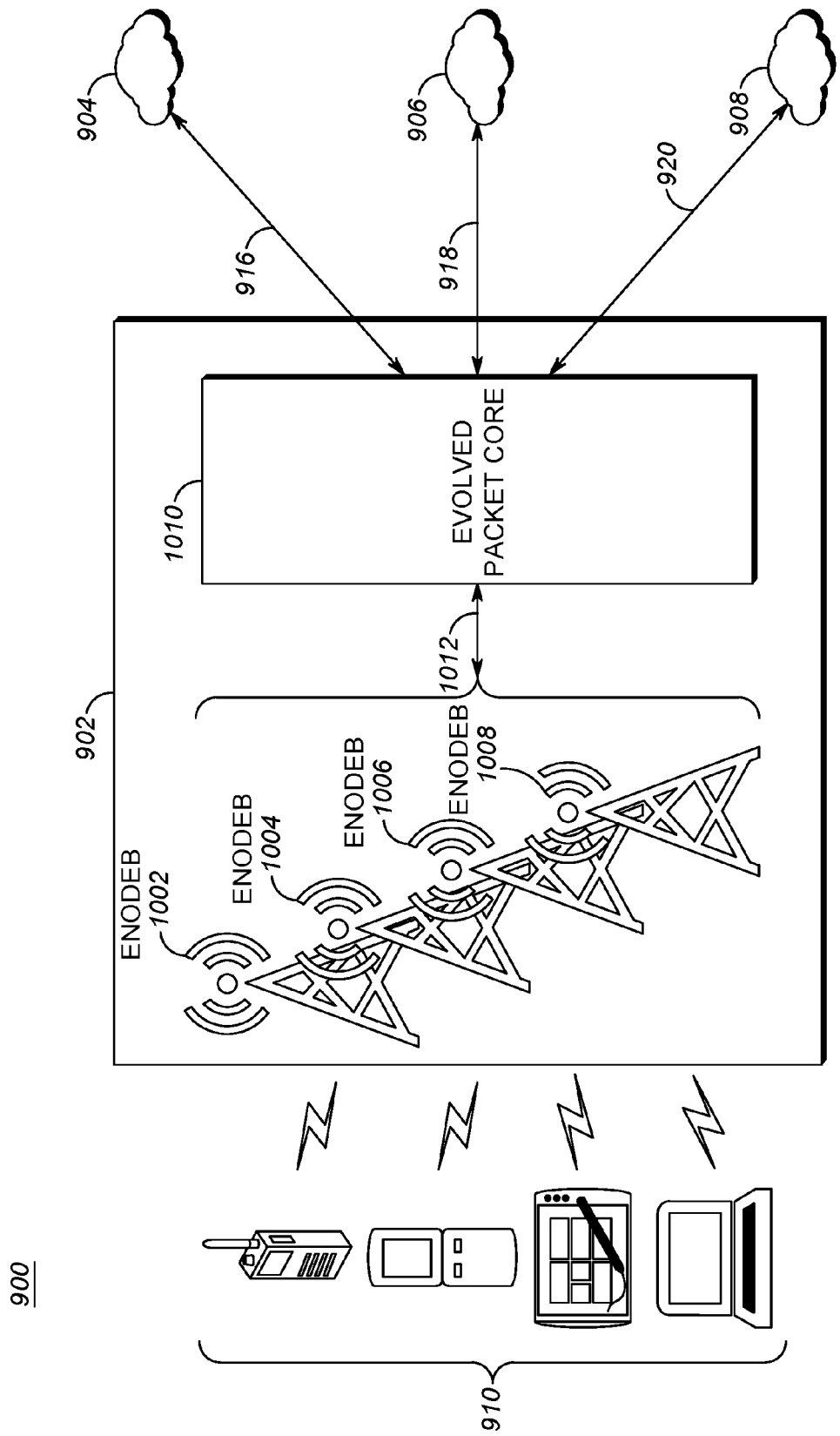
FIG. 10 depicts a further example of the communication system of FIG. 9, in accordance with an embodiment.
Figure 11:
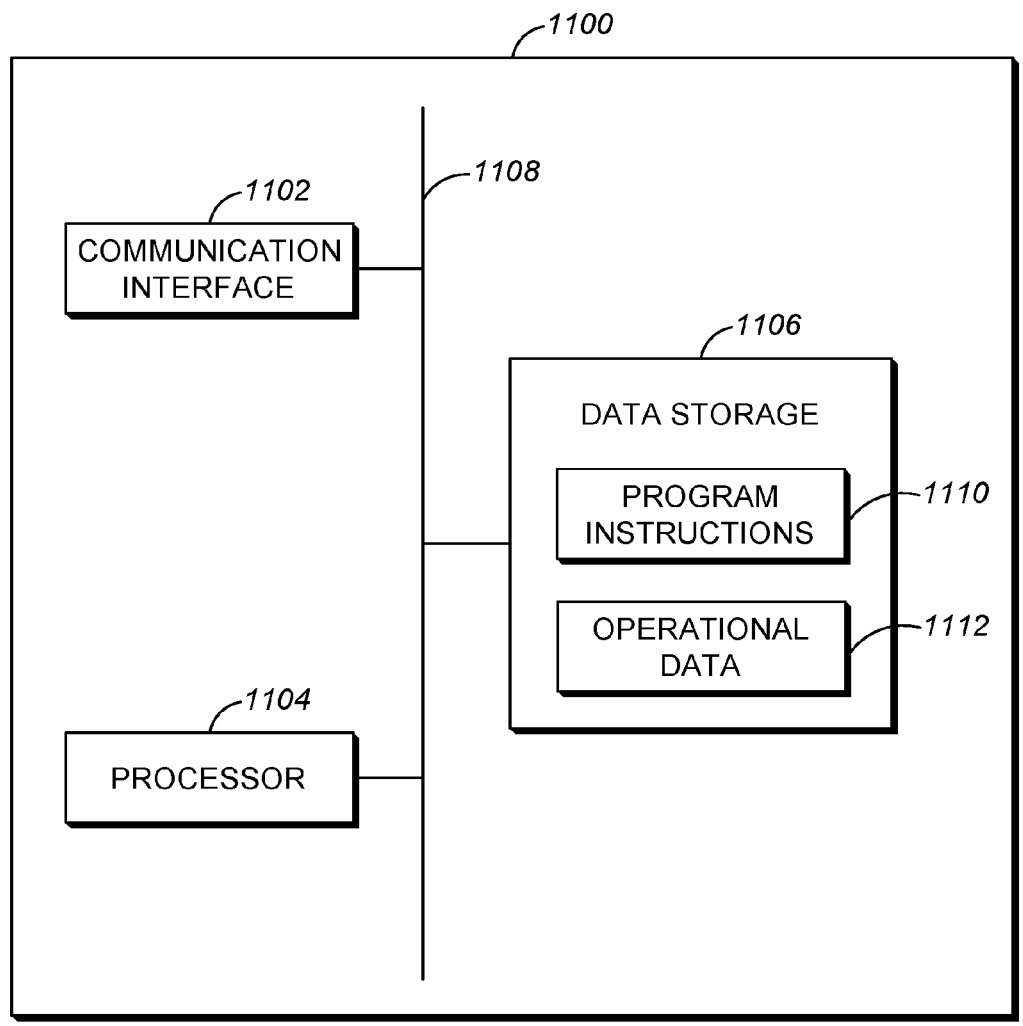
FIG. 11 depicts an example computing and communication device, in accordance with an embodiment.

The next portion of this disclosure includes descriptions of FIGS. 9-11, which in general depict a communication system in which WCDs communicate via one or more radio access networks (RANs). It is explicitly noted that WCDs that communicate via one or more RANs may also be capable of communicating directly with one another in the manner described above. Thus, while mobile radios that are capable of engaging in communication directly with one another but not via one or more RANs could certainly carry out and embody the present methods and systems, mobile radios that are capable of both direct-mode communication and RAN-based communication could certainly carry out and embody the present methods and systems as well.

FIG. 9 depicts an example communication system, in accordance with an embodiment. In particular, FIG. 9 depicts an example communication system 900 that includes one or more commercial RANs 902, a public-safety radio access network 904, a data network 906, a circuit network 908, WCDs 910, and communication links 912-926.

An example commercial RAN 902 is discussed below in connection with FIG. 10, though in general, each RAN 902 or 904 includes typical RAN elements such as base stations, base station controllers, routers, switches, and the like, arranged, connected, and programmed to provide wireless service to user equipment (e.g., WCDs 910) in a manner known to those of skill in the relevant art.

The public-safety RAN 904 may include one or more packet-switched networks and/or one or more circuit-switched networks, and in general functions to provide one or more public-safety agencies with any necessary computing and communication needs. Thus, the public-safety RAN 904 may include a dispatch center communicatively connected with the data network 906 and also with the circuit network 908, for retrieving and transmitting any necessary public-safety-related data and communications. The public-safety RAN 904 may also include any necessary computing, data-storage, and data-presentation resources utilized by public-safety personnel in carrying out their public-safety functions. Moreover, the public-safety RAN 904 may include one or more network access servers (NASs), gateways, and the like for bridging communications to one or more other entities and/or networks, such as the commercial RANs 902, the data network 906, and the circuit network 908, as representative examples.

The data network 906 may be, include, or be a part of the global network of networks typically referred to as the Internet. The data network 906 may be a packet-switched network, and entities (i.e., servers, routers, computers, and the like) that communicate over the data network 906 may be identified by a network address such as an Internet Protocol (IP) address. Moreover, the data network 906 may include one or more NASs, gateways, and the like for bridging communications to one or more other entities and/or networks, such as the commercial RANs 902, the public-safety RAN 904, and the circuit network 908, as representative examples.

The circuit network 908 may be, include, or be a part of the circuit-switched telephone network commonly referred to as the public switched telephone network (PSTN), and in general functions to provide circuit-switched communications to various communication entities as is known in the relevant art. Moreover, the circuit network 908 may include one or more NASs, gateways, and the like for bridging communications to one or more other entities and/or networks, such as the commercial RANs 902, the public-safety RAN 904, and the data network 906, as representative examples.

The WCDs 910 may be any suitable computing and communication devices configured to engage in wireless communication with one or both of the commercial RANs 902 over the air interface 912 as is known to those in the relevant art and the public-safety RAN 904 over the air interface 914 as is known to those in the relevant art. Some example WCDs 910, communication links 912, and communication links 914 are discussed below in connection with the various figures.

The depicted example communication system 900 includes communication links 912-926, any one or more of which could include one or more wireless-communication links and/or one or more wired-communication links. In FIG. 9, the communication links 912 and 914 are depicted with respective lightning-bolt graphics; while this graphic typically denotes wireless communication, and does in this example as well, this is not to the exclusion of one or more of the other communication links 914-926 being or at least including wireless-communication links as well.

As can be seen in FIG. 9, the communication link 916 connects the commercial RANs 902 and the public-safety RAN 904, the communication link 918 connects the commercial RANs 902 and the data network 906, the communication link 920 connects the commercial RANs 902 and the circuit network 908, the communication link 922 connects the public-safety RAN 904 and the data network 906, the communication link 912 (as mentioned above) connects the commercial RANs 902 and the WCDs 910, the communication link 924 connects the data network 906 and the circuit network 908, and the communication link 926 connects the public-safety RAN 904 and the circuit network

908. This arrangement is provided purely by way of example, as other arrangements could be implemented by those of skill in the relevant art in various different contexts.

FIG. 10 depicts a further example of the communication system of FIG. 9, in accordance with an embodiment. FIG. 10 depicts the communication system 900 of FIG. 9, though in more detail regarding some example WCDs 910 and an example RAN 902. In particular, FIG. 10 depicts the RAN 902 as including an eNodeB 1002, an eNodeB 1004, an eNodeB 1006, and an eNodeB 1008, each of which communicate directly or indirectly with an evolved packet core (EPC) 1010 over a communication link 1012. As is the case with each of the communication links mentioned above, and as is the case with any of the communication links mentioned anywhere else in this disclosure, the communication link 1012 may be or include one or more wireless-communication links and/or one or more wired-communication links, as deemed suitable by those of skill in the relevant art in a given context.

In at least one embodiment, each of the eNodeBs 1002-1008 include the hardware and software (and/or firmware) necessary for that eNodeB to function as an eNodeB, a NodeB, a base station, a base transceiver station (BTS), a WiFi access point, and/or the like, as known to those having skill in the relevant art. In some instances, one or more of the eNodeBs in the example RAN 902 may also include functionality typically associated in the art with entities that are often referred to by terms such as base station controllers (BSCs), radio network controllers (RNCs), and the like. Also, while four eNodeBs are depicted by way of example in FIG. 10, any suitable number of eNodeBs could be deployed as deemed suitable by those of skill in the relevant art.

In general, each eNodeB 1002-1008 is an entity that, on one side (i.e., the wireless-network side (interface)), engages in wireless communication over the air interface 912 with one or more WCDs 910 according to a protocol such as LTE or the like and, on the other side (i.e., the "backhaul" side), engages in communications with the EPC 1010 via the communication link 1012, to facilitate communications between various WCDs 910 and networks such as the networks 904, 906, and 908.

The EPC 1010 may include one or more network entities such as one or more mobility management entities (MMEs), one or more serving gateways (SGWs), one or more packet data network (PDN) gateways (PGWs), one or more evolved packet data gateways (ePDGs), one or more home subscriber servers (HSSs), one or more access network discovery and selection functions (ANDSFs), and/or one or more other entities deemed suitable for a given implementation by those of skill in the relevant art. Moreover, these entities may be configured and interconnected in a manner known to those of skill in the relevant art to provide wireless service to the WCDs 910 via the eNodeBs 1002-1008, and to bridge such wireless service with various transport networks. In general, an example RAN 902 may provide wireless service according to a protocol such as LTE, WiFi, and/or the like. These examples are provided for illustration and not by way of limitation; moreover, those of skill in the relevant art are aware of variations among different protocols and among different implementations of a given protocol, and of similarities across different protocols.

FIG. 11 depicts an example computing and communication device, in accordance with an embodiment. In particular, FIG. 11 depicts an example computing and communication device (CCD) 1100 as including a communication interface 1102, a processor 1104, and a data storage 1106, all of which are communicatively coupled with one another via a system bus (or other suitable communication mechanism, connection, network, or the like) 1108.

The communication interface 1102 may include one or more wireless-communication interfaces (for communicating according to, e.g., LTE, WiFi, Bluetooth, and/or one or more other protocols) and/or one or more wired-communication interfaces (for communicating according to, e.g., Ethernet, USB, and/or one or more other protocols). As such, the communication interface 1102 may include any necessary hardware (e.g., chipsets, antennas, Ethernet cards, etc.), any necessary firmware, and any necessary software for conducting one or more forms of communication with one or more other entities as described herein. The processor 1104 may include one or more processors of any type deemed suitable by those of skill in the relevant art, some examples including a general-purpose microprocessor and a dedicated digital signal processor (DSP).

The data storage 1106 may take the form of any non-transitory computer-readable medium or combination of such media, some examples including flash memory, read-only memory (ROM), and random-access memory (RAM) to name but a few, as any one or more types of non-transitory data-storage technology deemed suitable by those of skill in the relevant art could be used. As depicted in FIG. 11, the data storage 1106 contains program instructions 1110 executable by the processor 1104 for carrying out various functions.

In an embodiment in which a computing system such as the example CCD 1100 is arranged, programmed, and configured to carry out processes such as the process 100 described above, the program instructions 1110 are executable by the processor 1104 for carrying out those functions; in instances where other entities described herein have a structure similar to that of the example CCD 1100, the respective program instructions 1110 for those respective devices are executable by their respective processors 1104 to carry out functions respectively performed by those devices.

In various embodiments, a device (or system that includes multiple devices) such as the CCD 1100 could be suitably equipped, programmed, and configured to carry out the one or more functions described in this disclosure as being carried out by any one or any combination of the entities described herein and/or any other suitable CCDs. In some embodiments, a device or system such as the CCD 1100 is equipped, programmed, and configured to carry out the process 100 that is described above. Moreover, any one or more of the entities described herein could have an architecture or arrangement similar to that described in connection with the example CCD 1100.

FIG. 12 depicts a second example process, in accordance with an embodiment. In particular, FIG. 12 depicts a process 1200 that is similar in many respects to various other embodiments described above, and thus is not described here in as great of detail, though all permutations and variations discussed above with respect to any other embodiment apply with equal force to the example process 1200, which begins at step 1202, with a first mobile radio (e.g., the mobile radio 202) broadcasting a talkgroup invite. At step 1204, the first mobile radio receives respective talkgroup-invite responses from one or more other mobile radios that received the talkgroup invite. At step 1206, the first mobile radio measures respective response-RSSI values associated with receipt by the first mobile radio of the respective talkgroup-invite responses. At step 1208, the first mobile radio selects one or more of the other mobile radios based at least in part on the one or more measured response-RSSI values. At step 1210, the first mobile radio establishes a talkgroup that includes the first mobile radio and the one or more selected other mobile radios. At step 1212, the first mobile radio communicates as a participant in the established talkgroup.

Figure 13:
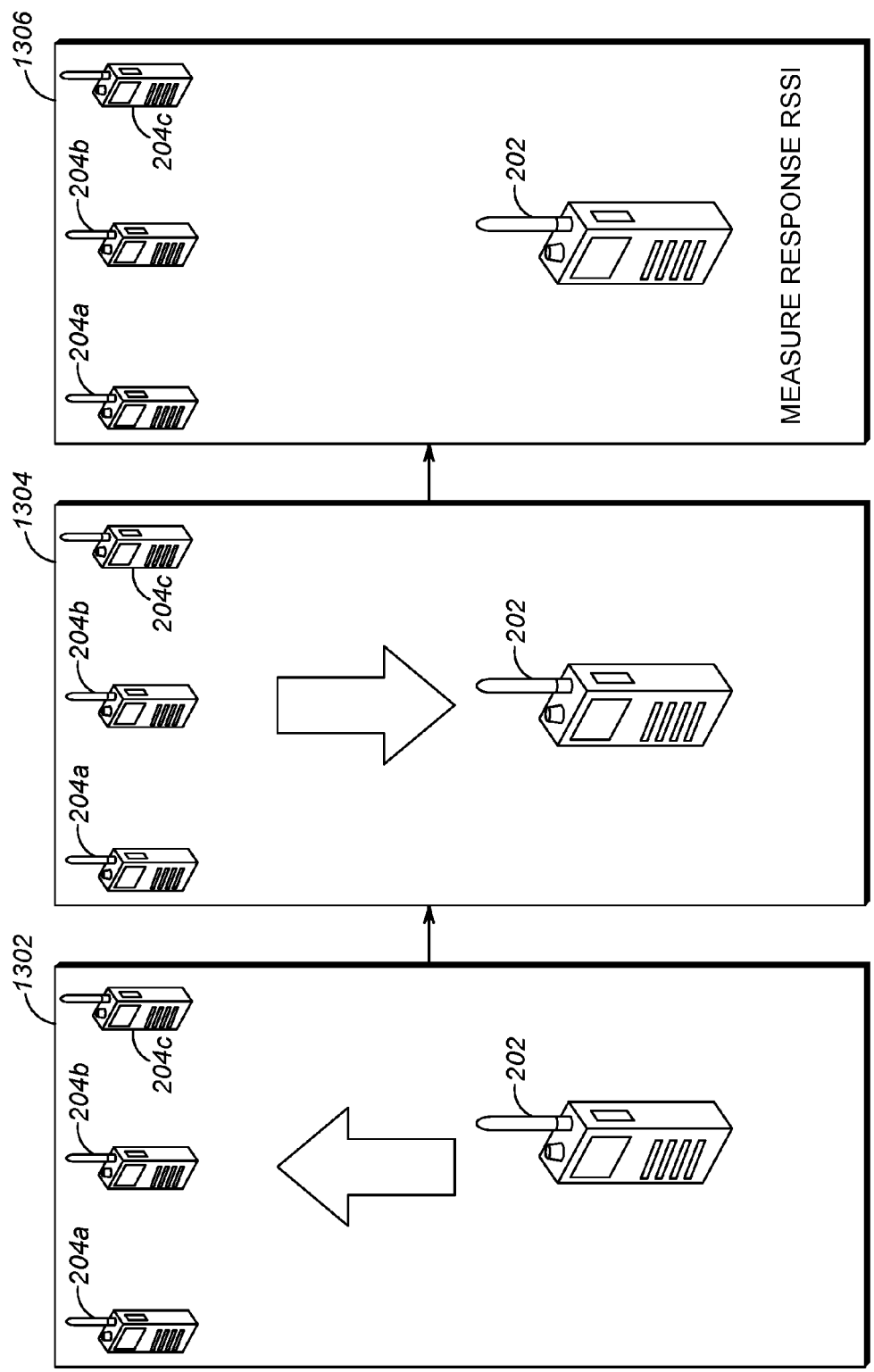
FIG. 13 depicts a fourth example messaging-and-processing sequence, in accordance with an embodiment.

FIG. 13 depicts a fourth example messaging-and-processing sequence, in accordance with an embodiment. In particular, FIG. 13 depicts an example messaging-and-processing sequence 1300 that is quite similar to the example messaging-and-processing sequence 800 that is described in connection with FIG. 8; moreover, the example sequence 1300 of FIG. 13 corresponds to the example process 1200 of FIG. 12. The example sequence 1300 includes time period 1302, in which the mobile radio 202 broadcasts a talkgroup invite to mobile radios 204*a-c* (and also to mobile radios 206*a-e* (not depicted). In time period 1304, the mobile radio 202 receives respective talkgroup-invite responses from the mobile radios that received the talkgroup invite (i.e., the mobile radio receives respective talkgroup-invite responses from the mobile radios 204*a-c* (pictured) and from the mobile radios 206*a-e* (not pictured)). In time period 1306 (perhaps with some overlap with the time period 1304), the mobile radio 202 measures respective response-RSSI values associated with receipt by the first mobile radio of the respective talkgroup-invite responses, selects the mobile radios 204*a-c*, based at least in part on the respective response-RSSI values (perhaps involving comparing those values to a given RSSI threshold), establishes a talkgroup (that includes the mobile radio 202, the mobile radio 204*a*, the mobile radio 204*b*, and the mobile radio 204*c*), and communicates as a participant in the established talkgroup.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes," "including," "contains," "containing," or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element preceded by "comprises . . . a," "has . . . a," "includes . . . a," "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method comprising:
a first mobile radio broadcasting a talkgroup invite;
the first mobile radio receiving respective talkgroup-invite responses from one or more other mobile radios;
the first mobile radio selecting one or more of the other mobile radios based on an invite-received-signal-strength-indicator of the talkgroup invite (invite-RSSI) value included in the talkgroup-invite response and associated with receipt of the talkgroup invite by the respective other mobile radio from which the talkgroup-invite response was received; and the first mobile radio establishing a talkgroup that includes the first mobile radio and the one or more selected other mobile radios;

the first mobile radio communicating as a participant in the established talkgroup; and wherein selecting one or more of the other mobile radios based at least in part on the one or more received invite-RSSI values comprises only selecting mobile radios whose invite-RSSI values indicate receipt of the talkgroup invite at or above an RSSI threshold.

2. The method of claim 1, wherein broadcasting the talkgroup invite comprises broadcasting the talkgroup invite on a base-station downlink frequency or a dedicated direct-mode channel.

3. The method of claim 1, wherein the received invite-RSSI values comprise RSSI-measurement indicators, the method further comprising:

the first mobile radio comparing the RSSI-measurement indicators to the RSSI threshold; and the first mobile radio only identifying mobile radios whose RSSI-measurement indicators meet or exceed the RSSI threshold as being mobile radios whose invite-RSSI values indicate receipt of the talkgroup invite at or above the RSSI threshold.

4. The method of claim 1, wherein the received invite-RSSI values comprise Boolean indicators reflecting whether the corresponding mobile radios received the talkgroup invite at or above the RSSI threshold, the method further comprising:

the first mobile radio only identifying mobile radios whose Boolean indicators are true as being mobile radios whose invite-RSSI values indicate receipt of the talkgroup invite at or above the RSSI threshold.

5. The method of claim 4, wherein the talkgroup invite comprises the RSSI threshold.

6. The method of claim 1, wherein the one or more selected other mobile radios make up a proper subset of the mobile radios whose invite-RSSI values indicate receipt of the talkgroup invite at or above the RSSI threshold.

7. The method of claim 1, wherein selecting one or more of the other mobile radios based at least in part on the one or more received invite-RSSI values further comprises only selecting mobile radios that satisfy one or more additional talkgroup qualifications.

8. The method of claim 7, wherein the talkgroup invite specifies one or more of the additional talkgroup qualifications.

9. The method of claim 8, wherein the one or more additional talkgroup qualifications include one or more of agency identifier, subscriber type, current talkgroup, altitude, and a list of one or more whitelisted subscriber identifiers.

10. The method of claim 7, wherein one or both of the RSSI threshold and one or more of the additional talkgroup qualifications are modifiable via a user interface of the first mobile radio.

11. The method of claim 1, further comprising:

the first mobile radio presenting via a user interface a plurality of identifiers of mobile radios whose invite-RSSI values indicate receipt of the talkgroup invite at or above the RSSI threshold; and the first mobile radio receiving via the user interface one or more user selections of one or more of the presented identifiers, wherein selecting one or more of the other mobile radios based at least in part on the one or more received invite-RSSI values comprises selecting the one or more mobile radios corresponding to the received one or more user selections.

12. The method of claim 1, wherein establishing the talkgroup that includes the first mobile radio and the one or more selected other mobile radios comprises adding the one or more selected other mobile radios to a current talkgroup of the first mobile radio.

13. The method of claim 1, further comprising the first mobile radio measuring the respective response-RSSI values.

14. The method of claim 1, carried out in response to the first mobile radio receiving a command to enter an emergency mode.

15. A system comprising a first mobile radio, the first mobile radio comprising:

a first communication interface;

a first processor; and first data storage containing first instructions executable by the first processor for causing the first mobile radio to carry out a set of first-mobile-radio functions, the set of first-mobile-radio functions including:

broadcasting a talkgroup invite;

receiving respective talkgroup-invite responses from one or more other mobile radios;

selecting one or more of the other mobile radios based on an invite-received-signal-strength-indicator (invite-RSSI) value included in the talkgroup-invite response and associated with receipt of the talkgroup invite by the respective other mobile radio from which the talkgroup-invite response was received; and establishing a talkgroup that includes the mobile radio and the one or more selected other mobile radios; and communicating as a participant in the established talkgroup;

wherein selecting one or more of the other mobile radios based at least in part on the one or more received invite-RSSI values comprises only selecting mobile radios whose invite-RSSI values indicate receipt of the talkgroup invite at or above an RSSI threshold.

16. The system of claim 15, further comprising the one or more other mobile radios, each other mobile radio comprising:

a respective other communication interface;

a respective other processor; and respective other data storage containing respective other instructions executable by the respective other processor for causing the respective other mobile radio to carry out a set of other-mobile-radio functions, the set of other-mobile-radio functions including:

monitoring an air interface for talkgroup invites;

receiving the broadcast talkgroup invite from the first mobile radio and responsively sending to the first mobile radio a corresponding talkgroup-invite response that includes a corresponding invite-RSSI value associated with receipt of the talkgroup invite by the corresponding other mobile radio; and communicating as a participant in the established talkgroup.

17. The system of claim 16, wherein the other communication interface comprises a first receiver and a second receiver, wherein monitoring the air interface for talkgroup invites comprises using the second receiver to monitor the air interface for talkgroup invites.

\* \* \* \* \*